United States Patent [19]

Obama et al.

[11] Patent Number: 4,920,806
[45] Date of Patent: May 1, 1990

[54] STRAIN GAGE

[75] Inventors: Masao Obama, Yokosuka; Masaaki Kikuchi, Tokyo, both of Japan

[73] Assignee: Kabushiki Kaisha Toshiba, Kawasaki, Japan

[21] Appl. No.: 311,340

[22] Filed: Feb. 16, 1989

[30] Foreign Application Priority Data

Feb. 19, 1988 [JP] Japan .................................. 63-36766

[51] Int. Cl.$^5$ .............................................. G01L 1/00
[52] U.S. Cl. ................................. 73/779; 73/DIG. 2; 73/862.69
[58] Field of Search .............. 73/DIG. 2, 779, 862.69, 73/862.68; 324/209

[56] References Cited

U.S. PATENT DOCUMENTS

| 3,299,382 | 1/1967 | Tanaka et al. ................... 73/DIG. 2 |
| 3,453,876 | 7/1969 | Radus ............................... 73/862.69 |
| 3,866,462 | 2/1975 | Fraudin ........................... 73/DIG. 2 |
| 4,596,150 | 6/1986 | Kuhr ..................................... 73/779 |

FOREIGN PATENT DOCUMENTS

| 62-175637 | 1/1986 | Japan . |
| 310137 | 7/1971 | U.S.S.R. ........................... 73/862.69 |
| 197706 | 6/1977 | U.S.S.R. ........................... 73/DIG. 2 |

Primary Examiner—Robert R. Raevis
Attorney, Agent, or Firm—Oblon, Spivak, McClelland, Maier & Neustadt

[57] ABSTRACT

A strain gage includes a pair of coils printed on one face of a substrate and an amorphous magnetic metallic plate arranged on the other face of said substrate and having magnetostrictive effect. Magnetic flux generated by one of the paired coils passes through the amorphous magnetic metallic plate and links with the other of the coils. When load is added to an object and strain of the object is caused by the load added, therefore, the magnetic permeability of the amorphous magnetic metallic plate is changed, due to the magnetostrictive effect, in response to the load added. The density of the magnetic flux passing through the magnetic metallic plate is also changed responsive to this changing magnetic permeability and composite inductance of the paired coils is then changed responsive to the changing density of the magnetic flux. The strain gage outputs a detection signal, which represents the changing density of the magnetic flux, thereby measuring the load added or strain of the object caused by the load added. The detecting sensitivity of the strain gage is more remarkably enhanced as compared with that of the conventional one. Further, the strain gage has a higher reliability and can be handled with more easiness.

17 Claims, 8 Drawing Sheets

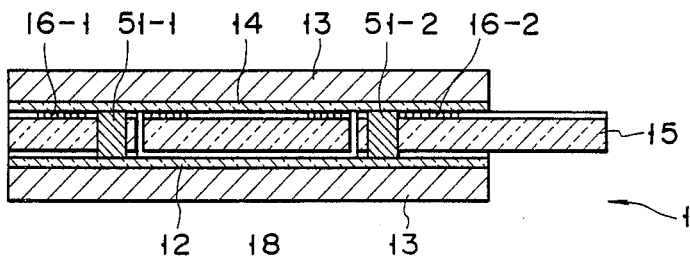
F I G. 14
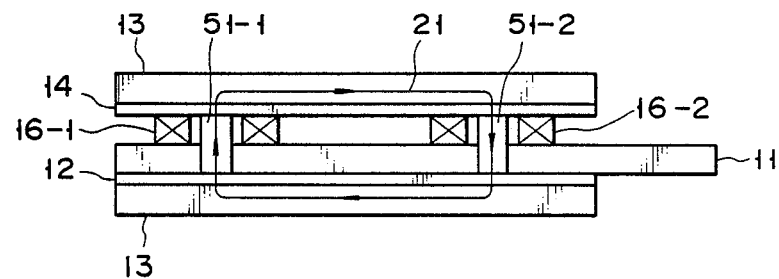
F I G. 15

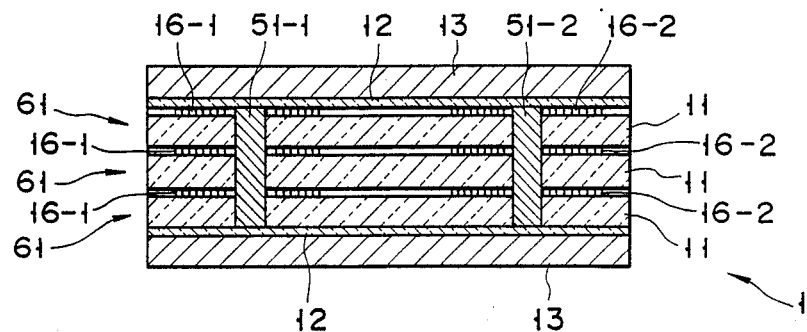
F I G. 16
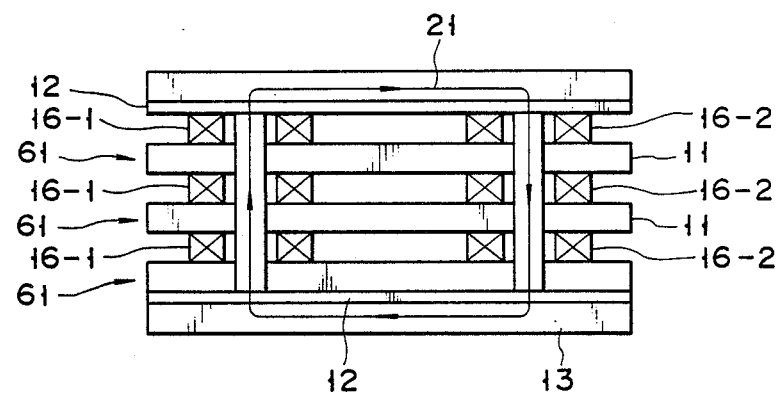
F I G. 17

STRAIN GAGE

BACKGROUND OF THE INVENTION

1. Field of the Invention

The present invention relates to a strain gage for detecting load added to a structural member and strain thus caused in the structural member when the structural member is elastically deformed by the load added.

2. Description of the Related Art

When load is added to a structural member and strain is thus caused in it by the load added, this load or strain is detected using various types of strain gages. One of these strain gages is of the metal resistance type, which has a metal resistance.

When load added or strain thus caused by the load is to be detected, the strain gage of this type is bonded to the structural member. The resistance value of the metal resistance changes in response to the load added and detection signal which represents this change of the resistance value is outputted. The load is thus measured and the strain is obtained from the load measured because the strain is in proportional to the load. The strain gage of this type is more frequently used as compared with those of the other types because its handling is relatively easier and its reliability is relatively higher.

However, the strain gage of this type is relatively lower in its detecting sensitivity. Two measures are sometimes employed to enhance its detecting sensitivity.

When the rigidity of the structural member is relatively high, the first measure employed is to increase the gain of detection signal. When the gain of detection signal is increased like this, however, SN ratio of detection signal becomes low.

When drive force generated by the arm of a robot which is the structural member is to be measured or when load added to the arm of the robot is to be measured, the second measure employed is to make relatively low the rigidity of that portion of the arm to which the strain gage is bonded. That portion of the arm to which the strain gage is bonded can be thus elastically deformed to a great extent to change detection signal. The detecting sensitivity of the strain gage can be enhanced accordingly. When the rigidity of the arm is made low, however, its response capacity is worsened.

This leads to a conclusion that the two measures which are employed to enhance the detecting sensitivity of the strain gage are not preferable.

The strain gage whose detecting sensitivity is relatively higher is of the semiconductor type. In the case of this strain gage of the semiconductor type, however, its detection characteristic changes as its temperature changes. Unless its temperature is kept in a certain range, therefore, detection signal outputted from it is not correct. This strain gage is low in reliability because of its possibility of creating detection errors. In addition, its handling is troublesome because its temperature must be controlled. Furthermore, it is difficult to perform complementary temperature compensation using two through four gages, since characteristic change rate caused by change in temperature is different from gage to gage. This is the reason why the strain gage of this type is hardly used.

There is thus needed a strain gage which has higher detecting sensitivity and reliability and which can be handled with more easiness.

SUMMARY OF THE INVENTION

The object of the present invention is to provide a strain gage, simpler in construction, having higher detecting sensitivity and reliability and capable of being handled with more easiness.

According to the present invention, there is provided a strain gage bonded to an object to be measured and capable of outputting detection signal which represents load added to the object or strain of the object caused by the load added, when the load is added to the object and the object is deformed by the load added to have strain, said strain gage comprising a substrate having a pair of faces opposite to each other and flexibility; a pair of coils printed on one face of the substrate, each of said coils having a spiral pattern and said paired coils being positioned in such a way that magnetic flux generated by one of these coils links with the other coil when alternating signal is supplied to these coils; an amorphous magnetic metallic plate (or ribbon) having magnetostrictive effect which causes the magnetic permeability of said amorphous magnetic metallic plate to be changed responsive to the load added to the object, said amorphous magnetic metallic plate being located on one of the opposite faces of the substrate so that at least a part of the magnetic flux generated by one of the paired coils form a closed magnetic circuit, passing through the amorphous magnetic metallic plate, and linking with the other coil and then with the one; and means for electrically insulating the amorphous magnetic metallic plate from the paired coil; wherein when the load is added to the object to be measured and strained of the object is thus caused by the load added, the magnetic permeability of said amorphous magnetic metallic plate is changed in response to the load added, the density of the magnetic flux passing through the amorphous magnetic metallic plate is changed as the magnetic permeability of the amorphous magnetic metallic plate changes, and composite inductance of the paired coils is changed in response to the change of this flux density, so that detection signal which represents the change of this composite inductance can be outputted and processed by the strain gage to measure the load added or strain caused in the object by the load added.

The strain gage according to the present invention includes only at least two plate members and a pair of coils printed on one of these plates. This can make the strain gage extremely simple in construction and extremely thin in thickness.

As will be described later, the strain gage has a gage factor (or index of detecting sensitivity) of 120–250, which tells that the detecting sensitivity of the strain gage is relatively high.

Even when the temperature of the amorphous magnetic metallic plate changes, its magnetostrictive effect is not changed in the case of this strain gage. Even when the temperature of the strain gage is not kept in a certain range, therefore, detection signal outputted can be correct. The strain gage thus has high reliability in that it has almost no possibility of causing errors in detecting the load added or strain caused by the load. It can also be handled with easiness in that its temperature is not needed to be under control. In reality, inductance will slightly change with temperature, since magnetic permeability will slightly change with temperature. However, the difference between gages in inductance change rate caused by temperature is negligibly small. Therefore, temperature compensation may be easily performed by a differential system which uses, for instance, two gages.

Apparent from the above, the strain gage according to the present invention, simpler in construction, has higher detecting sensitivity and reliability and it can be handled with more easiness.

BRIEF DESCRIPTION OF THE DRAWINGS

FIG. 14 is a sectional view showing a fourth example of the strain gage according to the present invention;

FIG. 15 shows the sectional view in FIG. 14 in more detail to explain how the strain gage in FIG. 14 functions;

FIG. 16 is a sectional view showing a fifth example of the strain gage according to the present invention; and FIG. 17 shows the sectional view in FIG. 16 in more detain to explain how the strain gage in FIG. 16 functions.

DETAILED DESCRIPTION OF THE PREFERRED EMBODIMENTS

Figure 1:
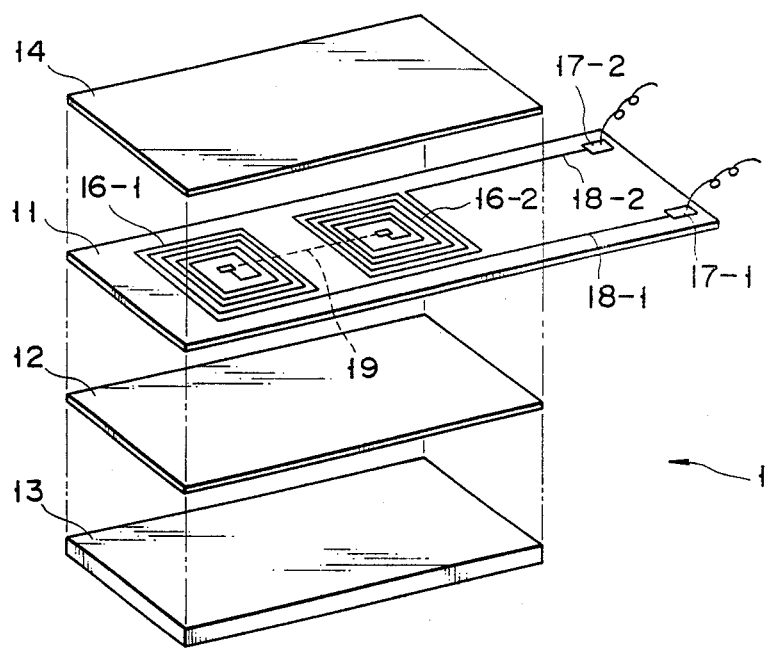
FIG. 1 is a perspective view showing a first example of the strain gage according to the present invention dismantled.
Figure 2:
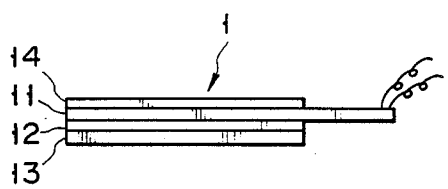
FIG. 2 is a front view showing the strain gage in FIG. 1.

FIGS. 1 and 2 show a first example of the strain gage according to the present invention. Strain gage 1 includes coil substrate 11 having flexibility and insulating ability, thin insulating sheet 12 bonded to the underside of coil substrate 11, amorphous magnetic metallic plate 13 bonded to the underside of insulating sheet 12, and insulating sheet 14 bonded to the top of coil substrate 11.

Coil substrate 11 is made of Mylar and shaped like a rectangle having two long sides and two short sides. It is 0.03 mm thick, its short side (or width) is 12 mm and its long side (or length) is 30 mm, for example.

A pair of coils 16-1 and 16-2 are printed on the top (or upper face) of substrate 11. In other words, a pair of printed wires are spiraled on the top of substrate 11 in the same direction to form paired coils 16-1 and 16-2, which are arranged on the top of substrate 11 in the longitudinal direction thereof.

Terminals 17-1 and 17-2 are also printed on the top of substrate 11. Each of the printed wires by which coils 16-1 and 16-2 are formed has an end positioned at the outermost end of the spiral and another end positioned at the innermost end of the spiral. The outermost end of the printed wire or coil 16-1 is connected to terminal 17-1 through connecting wire 18-1 printed on the top of substrate 11. The outermost end of the printed wire or coil 16-2 is also connected to terminal 17-2 via connecting wire 18-2 printed on the top of substrate 11. A second connecting wire 19 is printed on the underside of substrate 11. Both ends of this printed connecting wire 19 are connected to the innermost ends of the printed wires or coils 16-1 and 16-2, respectively, passing through substrate 11. The paired coils 16-1 and 16-2 are thus connected to each other in series. When current or alternating signal is supplied to coils 16-1 and 16-2, therefore, they generate magnetic fluxes directed reverse to each other.

Insulating sheets 12 and 14 are made by insulating paper or macromolecular sheet and each of them is shaped like a rectangle having two long sides and two short sides. The short side of each of these insulating sheets 12 and 14 is same in length as that of coil substrate 11 while the long side thereof has such a length as can overlap two of coils 16-1 and 16-2 but is shorter than that of the substrate. They are 0.03 mm thick, for example.

Amorphous magnetic metallic plate (or ribbon) 13 is shaped like a rectangle having two long sides and two short sides. The short side of magnetic metallic plate 13 is same in length as that of substrate 11 while the long side thereof has such a length as can overlap two of coils 16-1 and 16-2 but is shorter than that of the substrate. Amorphous magnetic metallic plate 13 has a composition of $(Fe_{1-x}CO_x)_{78}Si_8B_{14}$, example, and it is 30 μm thick, for example.

Amorphous magnetic metallic plate 13 has magnetostrictive effect, which represents that the magnetic permeability of amorphous magnetic metallic plate 13 changes remarkably when pulling or compressing force is added to amorphous magnetic metallic plate 13. More specifically, the magnetic permeability becomes small when pulling force is added to amorphous magnetic metallic plate 13 while it becomes large when compressing force is added to plate 13. Amorphous magnetic metallic plate 13 is subjected to magnetic anisotropy treatment such that the longitudinal direction of amorphous magnetic metallic plate 13 (or direction of aligning coils 16-1 and 16-2 on the top of substrate 11) intersects at predetermined angles the direction of the easy magnetization of amorphous magnetic metallic plate 13, ex. 45°.

Figure 3:
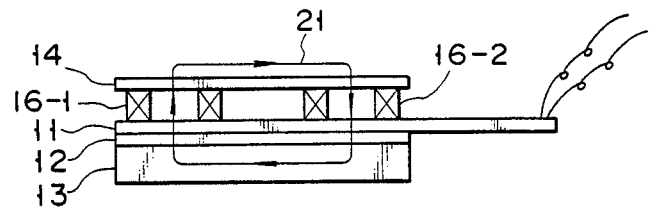
FIG. 3 shows the front view in FIG. 2 in more detail to explain how the strain gage in FIG. 1 functions.
Figure 4:
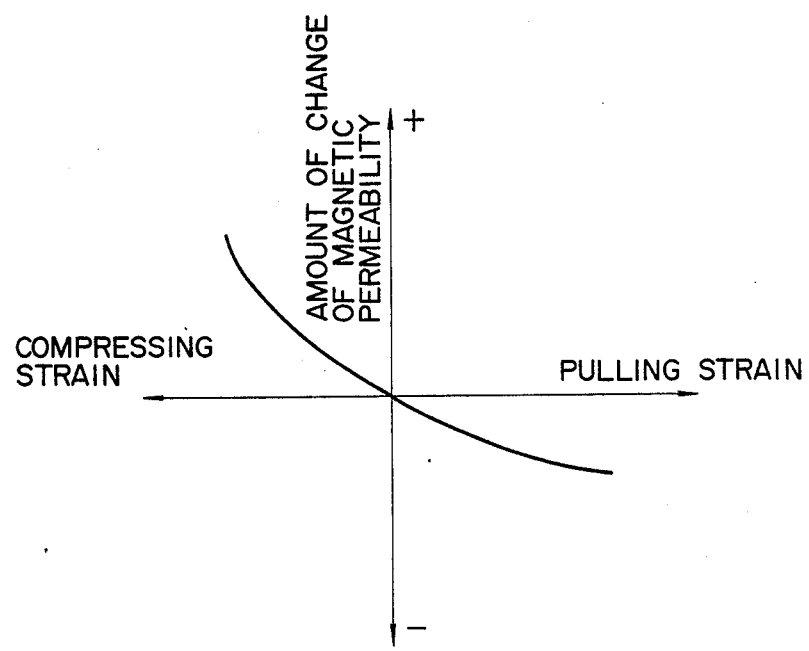
FIG. 4 is a graph showing the relation between pulling or compressing force added to an amorphous magnetic metallic plate of the strain gage and changing magnetic permeability of the amorphous magnetic metallic plate.

The function of this strain gage will be described referring to FIGS. 3 and 4.

When current or alternating signal is supplied to coils 16-1 and 16-2 through terminals 17-1 and 17-2, coils 16-1 and 16-2 generate magnetic fluxes directed reverse to each other. The magnetic fluxes generated by coils 16-1 and 16-2 thus form a closed magnetic circuit as shown by arrows in FIG. 3. The most of the magnetic flux generated by one of these coils links the other coil while passing through amorphous magnetic metallic plate 13 in the longitudinal direction thereof.

When load added to an object to be measured or strain caused in the object by the load added is to be measured, strain gage 1 is bonded to the object. When load is added to the object and strain is caused in the object by the load added, pulling or compressing force acts on amorphous magnetic metallic plate 13 of strain gage 1 in the longitudinal direction of plate 13. When pulling force is added to amorphous magnetic metallic plate 13, the magnetic permeability of plate 13 becomes small, while when compressing force is added to it, its magnetic permeability becomes large, as shown in FIG. 4. The density of the magnetic plate 13 changes in response to the changing magnetic permeability of plate 13. The composite inductance of coils 16-1 and 16-2 changes responsive to the changing density of the magnetic flux. The amount of change of this composite inductance, therefore, corresponds to the load added to the object as well as the pulling or compressing force added to plate 13. When strain gage 1 outputs detection signal which represents the changing composite inductance and this detection signal is processed, therefore, the load added can be measured. Strain can be calculated from the load added, because strain is proportional to load.

Figure 5:
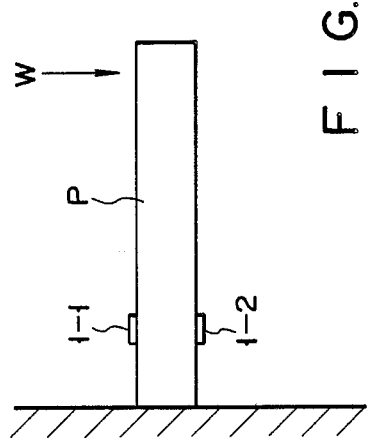
FIG. 5 shows two strain gages bonded to a structural member to detect load added to the structural member or strain caused in the structural member by the load added.
Figure 6:
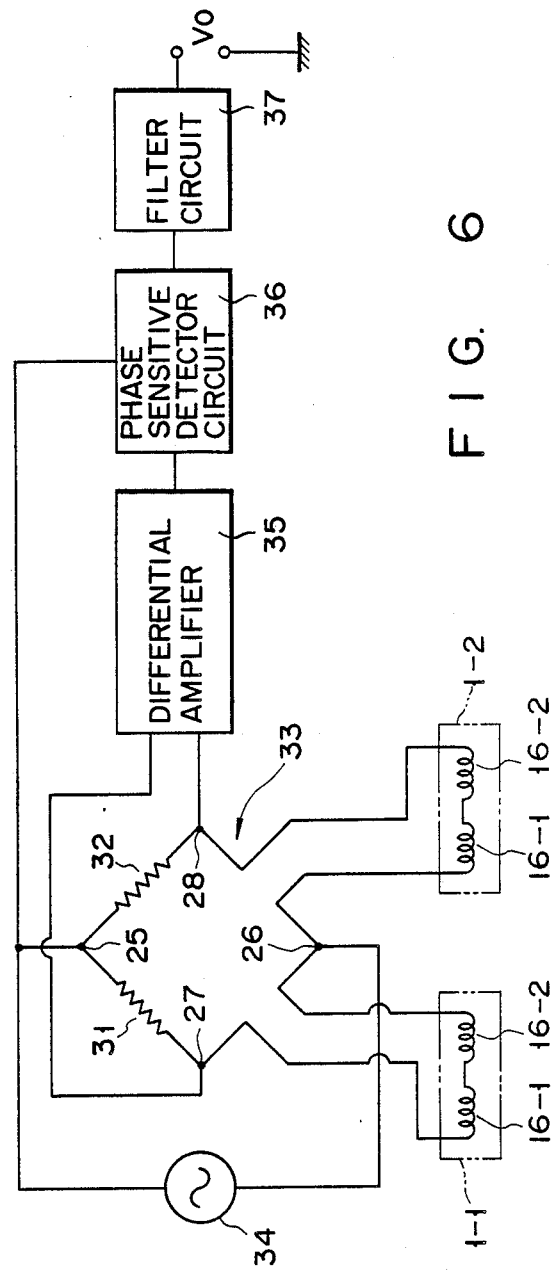
FIG. 6 is a circuit diagram intended to process detection signal which represents the changing composite inductance of paired coils in the strain gage.

Referring to FIGS. 5 and 6, there will be described a case where structural member P is elastically deformed by load W and strain thus caused in structural member P by load W added is to be measured. The device for measuring the load added or strain caused by the load added includes two of the above-described strain gages and a circuit for processing detection signal supplied from the two strain gages.

As shown in FIG. 5, a pair of strain gages 1-1 and 1-2 are bonded to the top and underside of structural member P. Amorphous magnetic metallic plate 13 of each of the strain gages is contacted with structural member P in this case and the longitudinal direction of metallic plate 13 is aligned with the vertical axis of structural member P while being made perpendicular to the direction of load W added.

According to the signal processing circuit, bridge circuit 33 comprises two resistances 31 and 32, pair of coils 16-1 and 16-2 of strain gage 1-1, and another pair of coils 16-1 and 16-2 of strain gage 1-2. In the case of this bridge circuit 33, alternating signal source 34 is connected between terminal 25 located between resistances 31 and 32 and terminal 26 located between strain gages 1-1 and 1-2. Namely, alternating signals which are certain in amplitude are supplied from alternating signal source 34 to the circuit between terminals 25 and 26. Further, differential amplifier 35 is connected between terminal 27 located between resistance 31 and strain gage 1-1 and terminal 28 located between resistance 32 and strain gage 1-2. Potential difference between the intermediate points of bridge circuit 33 (or potential difference between terminals 27 and 28) is introduced into and amplified by differential amplifier 35. The output of differential amplifier 35 is introduced into phase sensitive detector circuit 36 and detected and rectified there responsive to the phase difference between the signal supplied from alternating signal source 34 and the output introduced. The output of this phase sensitive detector circuit 36 is flattened by filter circuit 37 to gain DC output voltage Vo or output signal. This DC output voltage Vo corresponds to the amount of change of composite inductance in the coils of the strain gage (or load W), as will be described later.

Figure 7:
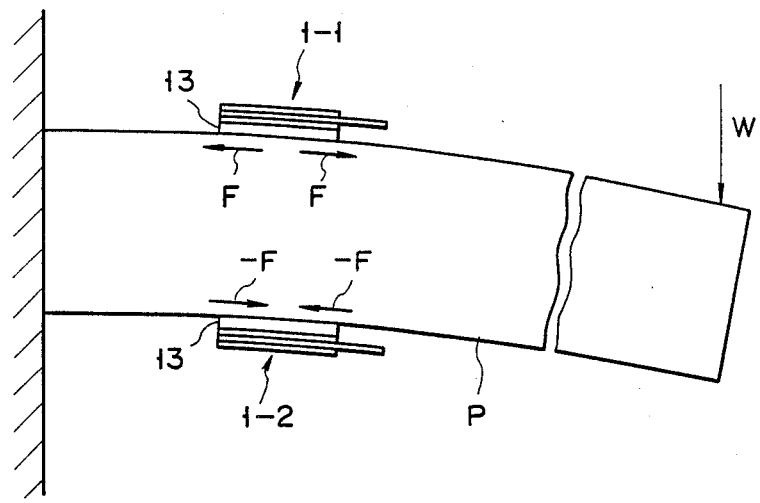
FIG. 7 is intended to explain how pulling or compressing force is added to a structural member when the structural member is elastically deformed by load added.

It will be described how the device provided with the strain gages and the signal processing circuit functions. When load W is added to structural member P and structural member P is elastically deformed by load P added, as shown in FIG. 7, pulling force F which corresponds to load W acts on amorphous magnetic metallic plate 13 of strain gage 1-1. As the result, the magnetic permeability of plate 13 becomes small. The composite inductance of coils 16-1 and 16-2 of strain gage 1-1 thus becomes smaller than before load W acts on structural member P.

On the other hand, compressing force $-F$ which corresponds to load W acts on amorphous magnetic metallic plate 13 of the other strain gage 1-2 when structural member P is elastically deformed by load W. As the result, the magnetic permeability of plate 13 becomes large. The composite inductance of coils 16-1 and 16-2 of strain gage 1-2 thus becomes larger than before load W is added to structural member P.

Figure 8:
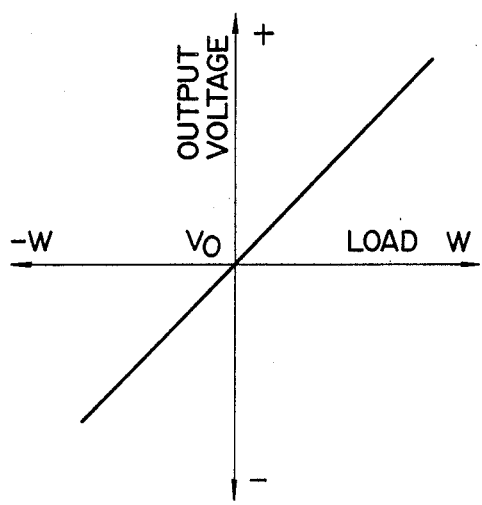
FIG. 8 is a graph showing the relation between signal (or potential difference) outputted from the signal processing circuit in FIG. 6 and load added to the structural member.

When load W acts on structural member P, potential difference between the intermediate points of bridge circuit 33 corresponds to the amount of change of the composite inductance in the two-paired coils of the paired strain gages (or load W), providing that the potential difference is set zero keeping structural member P free from load W. This potential difference is supplied, as an output, to filter circuit 37 via differential amplifier 35 and phase detector circuit 36 and picked up as an output signal or DC output voltage Vo. As shown in FIG. 8, therefore, this output signal or DC output voltage Vo is proportional to load W. When DC output voltage Vo is measured, therefore, load W can be measured and strain caused by load W can also be measured.

Test results obtained using the first example of the strain gage will be shown.

Gage factor which represents the index of sensitivity of the strain gage is used to evaluate the test results obtained. The gage factor in the case of the strain gage of the metal resistance type can be obtained from $(\Delta R/R)(\Delta l/l)$ wherein $(\Delta R/R)$ represents change ratio of electric resistance and $(\Delta l/l)$ denotes strain. The gage factor in the case of the strain gage of the present invention can be obtained from $(\Delta L/L)/(\Delta l/l)$ wherein $(\Delta L/L)$ represents change ratio of the composite inductance of the coils. As this gage factor becomes larger, the sensitivity of the strain gage becomes higher.

The strain gage used for the test is specified as follows. Amorphous magnetic metallic plate 13 is 0.03 mm thick, the interval beteween amorphous magnetic metallic plate 13 and insulating sheet 14 is 0.14 mm, each of coils 16-1 and 16-2 has 30 turns, and the distance between the centers of paired coils 16-1 and 16-2 is 10 mm.

When a strain of $400 \times 10^{-6}$ was added to amorphous magnetic metallic plate 13 in the longitudinal direction thereof under the above-described state, the composite inductance of coils 16-1 and 16-2 showed a change more than 5%. When this value is changed to gage factor, it is more than 125. In contrast, the gage factor in the case of the conventional strain gage of the metal resistance type is about 2. The sensitivity of the first example of the strain gage according to the present invention is remarkably higher as compared with that of the conventional strain gage of the metal resistance type.

The gage factor is 100–200 in the case of the strain gage of the semiconductor type and substantially same as that in the first example of the strain gage according to the present invention. In the case of the strain gage of the semiconductor type, however, its detecting characteristic changes as its temperature changes. Detection signal applied from it cannot be correct unless its temperature is kept in a certain range. Its reliability is poor because detection errors may be caused. In addition, its handling is troublesome because its temperature must be controlled. In the case of the strain gage according to the present invention, however, the magnetostrictive effect of amorphous magnetic metallic plate 13 will not change even when the temperature of plate 13 changes. Signal can be detected correctly even when the temperature of the strain gage is not kept in the certain range. Therefore, the strain gage of the presesnt invention has a higher reliability because no detection error is caused, and its handling is easier because its temperature need not be controlled.

Further, strain gage 1 comprises substrate 11, amorphous magnetic metallic plate 13, insulating plates 12, 14 and coils 16-1, 16-2 printed on substrate 11. Therefore, strain gage 1 can be made extremely simpler in construction and it can also be made extremely thinner.

Figure 9:
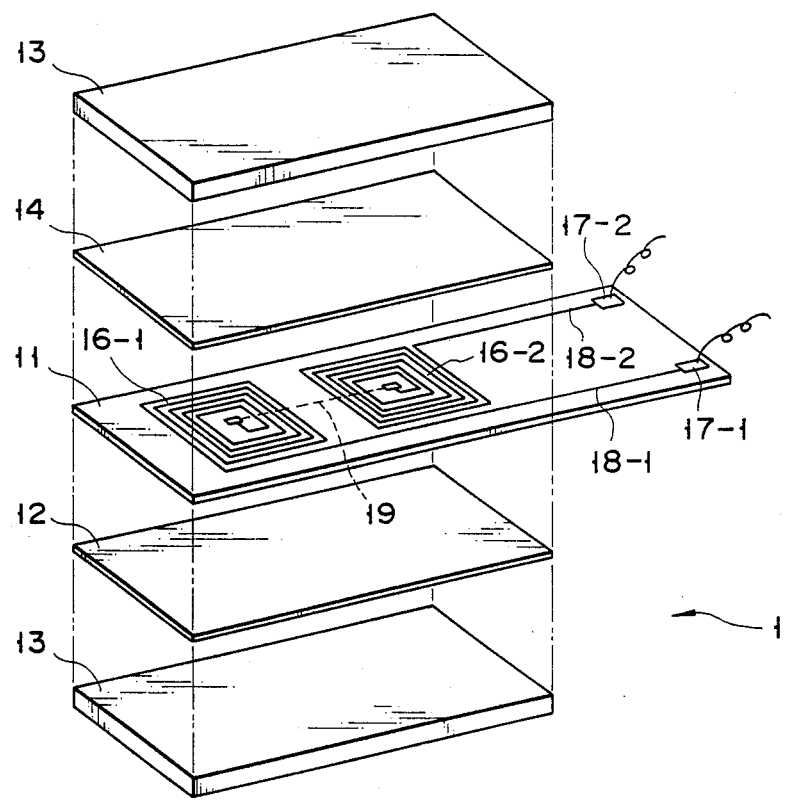
FIG. 9 is a perspective view showing a second example of the strain gage according to the present invention dismantled.
Figure 10:
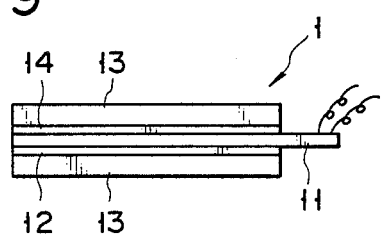
FIG. 10 is a front view showing the strain gage in FIG. 9.
Figure 11:
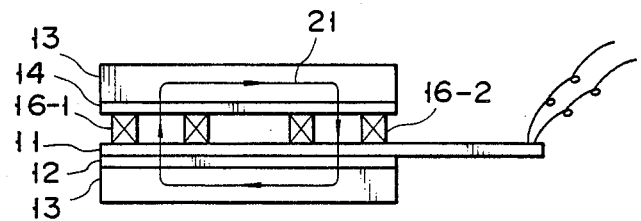
FIG. 11 shows the front view in FIG. 10 in more detail to explain how the strain gage in FIG. 9 functions.

FIGS. 9 through 11 show a second example of the strain gage according to the present invention. Although amorphous magnetic metallic plate 13 has been attached only to the top of substrate 11 in the case of the first strain gage, a pair of amorphous magnetic metallic plates 13 are attached to the top and underside of substrate 11 in the case of the second strain gage. Magnetic fluxes generated by coils 16-1 and 16-2 pass through paired amorphous magnetic metallic plates 13 in the longitudinal direction thereof, as shown by arrows 21 in FIG. 11. The ratio of that magnetic flux which passes through the amorphous magnetic metallic plates relative to all of the magnetic fluxes generated by the coils is larger than in the case of the first strain gage. Therefore, the density of the magnetic flux changes, responsive to the pulling or compressing force acting on amorphous magnetic metallic plates 13, to an extent greater than in the first strain gage. As the result, the composite inductance of the coils shows a greater change as compared with the first strain gage. The detecting sensitivity of the second strain gage is higher than that of the first one.

Test results obtained using the second strain gage were as follows and the strain gage used for the test was specified as follows. Each of amorphous magnetic metallic plates 13 was 0.03 mm thick, the interval between paired amorphous magnetic metallic plates 13 was 0.2 mm, each of coils 16-1 and 16-2 had 30 turns, and the distance between the centers of paired coils 16-1 and 16-2 was 10 mm. When a strain of $400 \times 10^{-6}$ is added to amorphous magnetic metallic plates 13, the composite inductance of the coils was more than 10%. When this value is changed to gage factor, it is more than 250. As apparent from this, the detectisng sensitivity of the second strain gage is more enhanced that that of the first one.

Paired amorphous magnetic metallic plates 13 are attached to both sides of substrate 11 in the case of the second strain gage. This strain gage may be thus made thicker than the first one. Even when the amorphous magnetic metallic plate is made thin, however, its magnetostrictive effect can be kept unchanged. When both of the amorphous magnetic metallic plates are made relatively thin, therefore, the strain gage can be refrained from becoming thick. Even when a pair of the amorphous magnetic metallic plates are attached to both sides of the substrate, the thickness of the second strain gage cannot be more remarkably increased, as compared with the first one.

Figure 12:
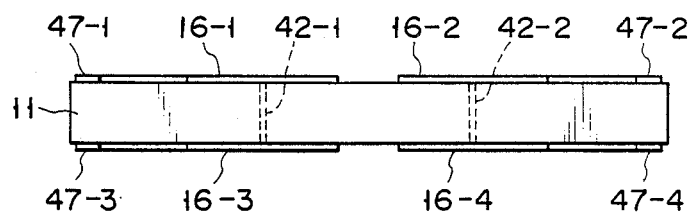
FIG. 12 is a front view showing a part (or a substrate and two pairs of coils) of a third example of the strain gage according to the present invention.
Figure 13:
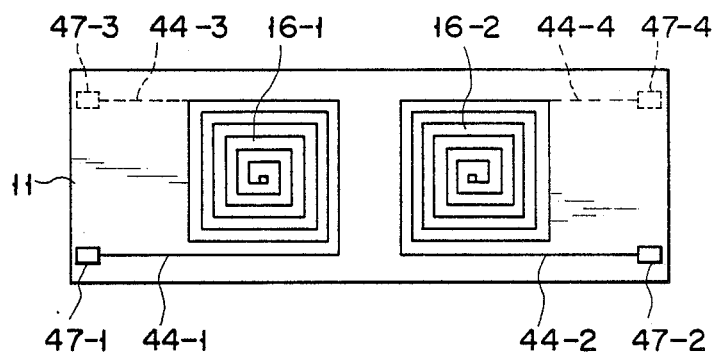
FIG. 13 is a plan showing a part (or a substrate and two pairs of coils) of the strain gage in FIG. 12.

FIGS. 12 and 13 shows a third example of the strain gage according to the present invention. Two pairs of coils are arranged on the top and underside of the substrate, respectively, in the case of this third strain gage. More specifically, a pair of coils 16-1, 16-2 are arranged on the top of substrate 11, while another pair of coils 16-3, 16-4 are arranged on the underside of substrate 11. The innermost ends of coils 16-1 and 16-3 are connected to each other by connecting wire 42-1 which passes through substrate 11. Similarly, the innermost ends of coils 16-2 and 16-4 are connected to each other by connecting wire 42-2 which passes through substrate 11. The outermost ends of the printed wires of coils 16-1–16-4 are connected to terminals 47-1–47-4, respectively, via connecting wires 44-1–44-4 printed on both sides of substrate 11. When current is supplied to terminals 47-1–47-4, magnetic flux generated by coils 16-1 and 16-3 is directed reverse to magneti flux generated by coils 16-2 and 16-4. Further, the magnetic flux generated by one paired coils links with the one generated by the other paired coils. Therefore, these magnetic fluxes form a closed magnetic circuit, passing through the amorphous magnetic metallic plates in the longitudinal direction thereof.

The turns of each of the coils are increased in this third strain gage without making the strain gage thicker and wider. The coils of this strain gage have therefore an inductance larger than the coils of the first one. This enables this third strain gage to have a detecting sensitivity higher than the first one.

FIGS. 14 and 15 show a fourth example of the strain gage according to the present invention. This fourth strain gage is an improvement of the second one shown in FIGS. 9 and 10. As shown in FIG. 14, cores 51-1 and 51-2 each made of ferromagnetic material and shaped like a column are arranged passing through the centers of coils 16-1, 16-2 and substrate 11. The ratio of leaked magnetic flux relative to all of magnetic fluxes generated by the coils is reduced while the ratio of main magnetic flux relative to all of the magnetic fluxes generated is increased. As shown by arrows 21 in FIG. 15, therefore, the ratio of that magnetic flux which passes through amorphous magnetic metallic plates 13 relative to all of the magnetic fluxes generated by the coils is more increased than in the case of the second strain gage. The density of the magnetic flux and the inductance of the coils which change responsive to the changing magnetic permeability of the amorphous magnetic metallic plates change to those extents grater than in the case of the second strain gage. This enables this fourth strain gage to have a detecting sensitivity higher than the second one.

FIGS. 16 and 17 show a fifth example of the strain gage according to the present invention. This strain gage comprises three coil units 61 piled one upon the others and each of these coil units 61 includes substrate 11 and coils 16-1. 16-2 printed on one side of substrate 11. Center axis lines of coils 16-1 are aligned with one another while those of coils 16-2 are also aligned with one another. Further, cores 51-1 and 51-2 each made of ferromagnetic material and shaped like a column are arranged passing through center areas of coils 16-1, 16-2 and substrates 11 of three coil units 61. Vertical axis lines of cores 51-1 and 52-2 are aligned with center axis lines of coils 16-1 and those of coils 16-2, respectively.

This fifth strain gage can achieve same effect as that of the fourth one. Further, the composite inductance value of the coils is made larger than in the case of the fourth one. This enables the signal processing circuit to be made simpler in construction and the fifth strain gage to be handled with more easiness.

What is claimed is:

1. A strain gage bonded to an object and capable of outputting a detection signal which represents a load added to the object or strain of the object caused by the load added, when the load is added to the object and the object is deformed by the load added creating a strain, said strain gage comprising:
   a substrate having a pair of faces opposite to each other and flexibility;
   a pair of coils printed on one face of the substrate, each of said coils having a spiral pattern and said paired coils being positioned in such a way that magnetic flux generated by one of these coils links with the other coil when an alternating signal is supplied to these coils;
   an amorphous magnetic metallic plate having a magnetostrictive effect which causes the magnetic permeability of said amorphous magnetic metallic plate to be changed responsive to the load added to the object, said amorphous magnetic metallic plate being located on one of the opposite faces of the substrate so that at least a part of the magnetic flux generated by one of the paired coils forms a closed magnetic circuit, passing through the amorphous magnetic metallic plate, and linking with the other coil and then with one coil; and
   means for electrically insulating the amorphous magnetic metallic plate from the paired coils;
   wherein when the load is added to the object to be measured and strain of the object is thus caused by the load added, the magnetic permeability of said amorphous magnetic metallic plate is changed in response to the load added, the density of the magnetic flux passing through the amorphous magnetic metallic plate is changed as the magnetic permeability of the amorphous magnetic metallic plate changes, and the composite inductance of the paired coils is changed in response to the change of this flux density, so that the detection signal which respresents the change of this composite inductance can be outputted by the strain gage to measure the load added or strain caused in the object by the load added.

2. The strain gage according to claim 1, wherein said substrate includes a pair of terminals printed on the substrate to receive the alternating signal and to output the detection signal therethrough, and plural connecting wires printed on the substrate to connect the paired coils with each other and the paired coils to the paired terminals.

3. The strain gage according to claim 1, wherein said substrate is shaped like a rectangle having long and short sides and the paired coils are aligned on one face of said substrate in the longitudinal direction thereof.

4. The strain gage according to claim 3, wherein said amorphous magnetic metallic plate is subjected to magnetic anisotropy treatment such that the direction of its easy magnetization intersects at predetermined angles the direction of the magnetic flux which passes through said plate.

5. The strain gage according to claim 3, wherein the paired coils are electrically connected to each other and their spirals are directed in such a way that the direction of magnetic flux generated by one of them is reverse to that of magnetic flux generated by the other of them.

6. The strain gage according to claim 5, wherein the paired coils are connected in series to each other and their spirals are directed in a same direction, so that magnetic fluxes generated by them can be directed reverse to each other.

7. The strain gage according to claim 6, wherein each of said coils is a wire printed like a spiral on one side of said substrate and said printed wire has a first end located at the outermost of the spiral and a second end located at the innermost thereof, and wherein said substrate includes a pair of terminals printed on one face of said substrate to receive the alternating signal and to output the detection signal therethrough, a pair of first connecting wires printed on one face of said substrate to connect the paired terminals to the first ends of said paired wire coils printed, and a second connecting wire printed on the other face of said substrate to connect the second ends of the paired wire coils printed.

8. The strain gage according to claim 1, wherein said insulating means includes a plate sandwiched between said substrate and said amorphous magnetic metallic plate to insulate the substrate and the plate from each other.

9. The strain gage according to claim 1, wherein two amorphous magnetic metallic plates are arranged on both sides of said substrate, so that at least a part of magnetic flux generated by one of the coils can form a closed magnetic circuit, passing through one of the amorphous magnetic metallic plates, linking with the other of the coils, passing through the other of the amorphous magnetic metallic plates, and linking with the one of the coils.

10. The strain gage according to claim 1, wherein a further pair of coils is printed on the opposite face of said substrate and positioned in such a way that magnetic flux generated by one coil of said further pair links with the other coil of said further pair.

11. The strain gage according to claim 1, wherein each of the coils has a core made of ferromagnetic material and at least a part of each said core is located substantially in the center area of the respective coil.

12. The strain gage according to claim 11, wherein most of each core is embedded in the substrate.

13. A strain gage bonded to an object and capable of outputting a detection signal which represents load added to the object or strain of the object caused by the load added, when the load is added to the object and the object is deformed by the load added creating a strain, said strain gage comprising:
   (A) a coil unit including,
      (a) a substrate having a pair of faces opposite to each other and flexibility, and
      (b) at least one pair of coils printed on one face of the substrate, each of said coils having a spiral pattern and said paired coils being positioned in such way that magnetic flux generated by one of these coils links with the other coil when alternating signal is supplied to these coils;

(B) an amorphous magnetic metallic plate having a magnetostrictive effect which causes the magnetic permeability of said amorphous magnetic metallic plate to be changed responsive to the load added to the object, said amorphous magnetic metallic plate being located on one of the opposite faces of the substrate so that at least a part of the magnetic flux generated by one of the paired coils forms a closed magnetic circuit, passing through the amorphous magnetic metallic plate, and linking with the other of the coils and then with the one coil thereof; and (C) means for electrically insulating the amorphous magnetic metallic plate from the paired coils;

wherein when the load is added to the object and strain of the object is thus caused by the load added, the magnetic permeability of said amorphous magnetic metallic plate is changed in response to the load added, the density of the magnetic flux passing through the amorphous magnetic metallic plate is changed as the magnetic permeability of the amorphous magnetic metallic plate changes, and the composite inductance of the paired coils is changed in response to the change of this flux density, so that the detection signal which represents the change of this composite inductance can be outputted by the strain gage to obtain the load added or strain caused in the object by the load added.

14. The strain gage according to claim 13, comprising plural pairs of coils piled one upon the others.

15. The strain gage according to claim 14, wherein each of the coils has a center axis line extending through the center of its spiral and said plural coil units are piled one upon the others in such a manner that a pair of the center axis lines extending through the centers of the paired coils on one coil unit are aligned with those extending through the centers of the paired coils on the other coil units.

16. The strain gage according to claim 15, wherein each of said coils has a core made of ferromagnetic material and each said core is positioned along the center axis line of the respective of the coils.

17. A device for measuring load added or strain caused by the load added, when the load is added to an object and the object is deformed creating a strain, device comprising:

(A) a strain gage bonded to the object to be measured and capable of outputting a detection signal which represents the load added to the object or strain of the object caused by the load added, said strain gage including,
  (a) a substrate having a pair of faces opposite to each other and flexibility ,
  (b) a pair of coils printed on one face of the substrate, each of said coils having a spiral pattern and said paired coils being positioned in such a way that magnetic flux generated by one of these coils links with the other coil,
  (c) an amorphous magnetic metallic plate having magnetostrictive effect which causes the magnetic permeability of said amorphous magnetic metallic plate to be changed responsive to the load added to the object, said amorphous magnetic metallic plate being located on one of the opposite faces of the substrate so that at least a part of the magnetic flux generated by one of the paired coils forms a closed magnetic circuit, passing through the amorphous magnetic metallic plate, and linking with the other of the coils and then with the one thereof, and
  (d) means for electrically insulating the amorphous magnetic metallic plate from the paired coils;

(B) means for supplying alternating signal to the paired coils; the (C) means for processing the detection signal applied from said strain gage and outputting an output signal;

wherein when the load is added to the object and strain of the object is thus caused by the load added, the magnetic permeability of said amorphous magnetic metallic plate is changed in response to the load added, the density of the magentic flux passing through the amorphous magnetic metallic plate is changed as the magnetic permeability of the amorphous magnetic metallic plate changes, and the composite inductance of the paired coils is changed in response to the change of this flux density, so that said strain gage can output the detection signal which represents the change of this composite inductance and so that the load added or strain caused in the object by the load added can be measured on the basis of the output signal applied from the signal processing and outputting means.

* * * * *